March 19, 1968 L. J. COLEMAN 3,374,026
MEAT TONGS
Filed Oct. 3, 1966
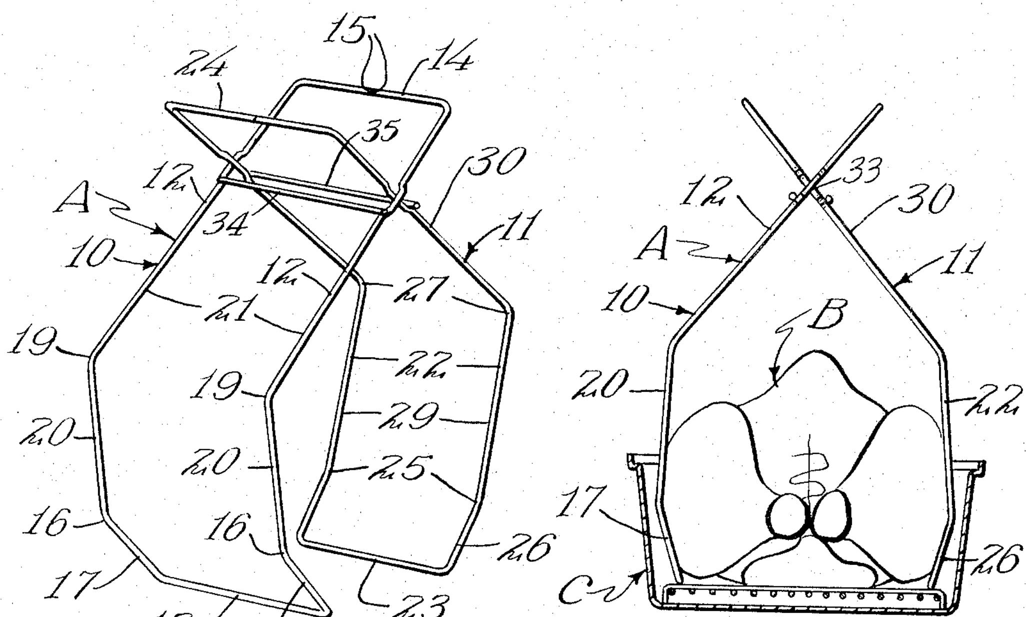
FIG. 1
FIG. 2
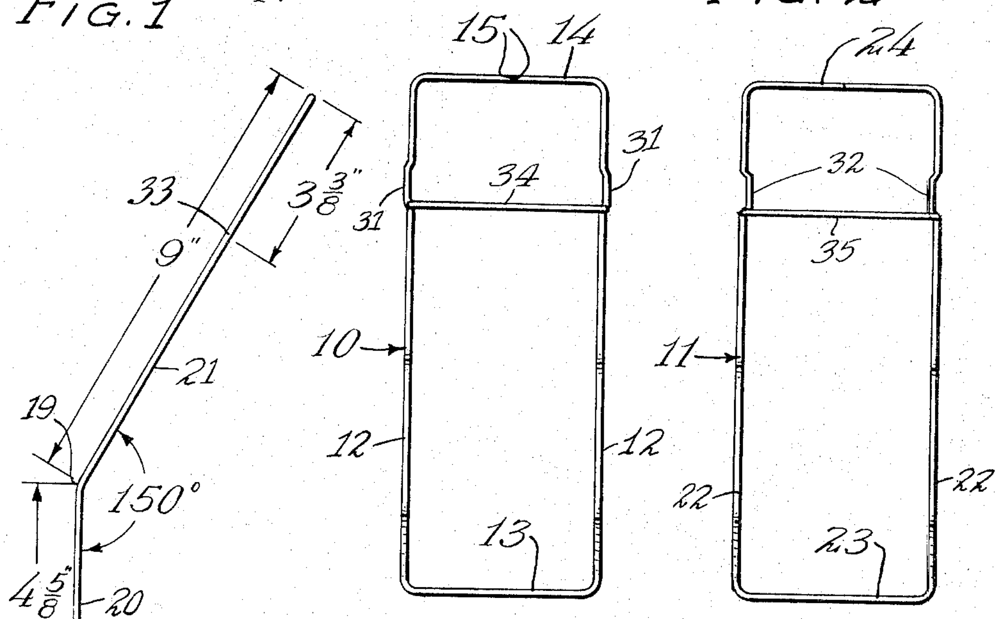
FIG. 3
FIG. 4
FIG. 5
INVENTOR
LAWRENCE J. COLEMAN
BY Robert M. Dunning
ATTORNEY United States Patent Office 3,374,026

Patented Mar. 19, 1968

1

3,374,026
MEAT TONGS

Lawrence J. Coleman, 304 Northwest Bank Bldg., St. Paul, Minn. 55101

Continuation-in-part of application Ser. No. 402,308, Oct. 7, 1964. This application Oct. 3, 1966, Ser. No. 583,739

4 Claims. (Cl. 294—16)

ABSTRACT OF THE DISCLOSURE

This invention involves a pair of tong arms pivotally connected in intersecting relation. The tong levers are rectangular, elongated, loop-shaped members, one end of each loop forming the handle and the other end forming the gripping ends of the lever arms. The tong arms are bent transversely to provide an intermediate section, a handle section which is substantially longer than the intermediate section, and a gripping section substantially shorter.

This application is a continuation-in-part of my previous application for Meat Tongs, Ser. No. 402,308 filed Oct. 7, 1964, now abandoned.

This application relates to meat tongs particularly adapted for lifting and holding large pieces of meat or fowl such as roasts, turkeys, hams and the like. Difficulty is often experienced removing large pieces of meat from roasters and the like. This is particularly true when the size of the piece of meat to be removed is almost as large as the roaster itself. It is sometimes almost impossible to get a spoon or similar tool beneath the meat, and when meat is tender, it is difficult to remove with a fork or pair of forks. Thus tongs designed for the specific service have been found to be the most effective way of accomplishing the desired result.

Various types of tongs have been produced for the present purpose. One of the biggest difficulties lies in the fact that it is hard to design the jaws of the tongs in such a manner that they will fit between the sides of the meat or fowl and the walls of the roaster, and will still extend sufficiently below the meat so that it may be lifted. It is the object of the present invention to provide tongs having jaws which will fit in a narrow space between the meat to be lifted and the walls of the roaster, and which will yet permit the meat to be lifted from the pan.

Another difficulty of previously constructed tongs lies in the fact that they are often difficult to clean particularly at the point of hinge between the tong handles. The present tongs are so designed that they can be easily and thus may be maintained in a sanitary condition.

A feature of the present invention resides in the provision of a pair of tongs comprising a pair of arms which are pivotally connected near the handle ends thereof. Each arm is formed of a generally rectangular loop of wire rod or similar material. The arms are elongated in an upright direction with the upper ends of the loops forming the handles, and the lower ends of the loops forming the meat gripping end. The particular manner in which the two arms or jaws are formed is of importance, as it is the shape of the jaws which makes them function effectively in removing the meat from the roaster or similar receptacle.

A feature of the present invention resides in a provision of a pair of meat tongs of the type described in which the two arms are bent to provide three sections in angular relation, each of the three sections being in substantially a common plane. The lower section includes the lower ends of the parallel side arms, and the cross bar at the bottom of the arm. The intermediate section is about twice as long as the lower end section, and comprises

2 merely parallel intermediate portions of the longitudinal sides of the arms. The upper section is almost twice as long as the intermediate section, and comprises the upper ends of the two side arms, and the cross-member which forms the handle. In the arrangement illustrated, it also includes a transverse brace which prevents the longitudinal sides of the arms from spreading apart or flexing together. The point of hinge is slightly more than one-third of the length of the upper section from the handle bar. The planes of the upper section and of the lower section are approximately 150° apart, or slightly greater.

A feature of the present invention lies in the shape of the jaws. The arrangement is such that the lower ends of the tong arms require very little space on opposite sides of the meat so that the tongs may be inserted between the meat and the wall of the roaster or other receptacle. The arrangement is such that the relatively short lower sections of the tongs may extend sufficiently beneath the body of meat to permit the meat to be readily lifted. Furthermore, due to the shape of the tongs, the tongs may be used for a relatively small body of meat as well as for a large one.

A feature of the present invention resides in the simplicity of construction of the tongs, which permits them to be made and sold at relatively low cost. In the particular form of construction illustrated, the hinges are formed by offsetting short portions of the longitudinal sides of the arms, one arm having the portions offset inwardly, and the other having the sides offset outwardly. After the tongs are flexed into intersecting relation with the offset portions interengaging, transverse braces are provided across each loop closely adjoining the points of intersection which hold this portion of the arm from flexing inwardly or outwardly to hold the arms interengaged.

These and other objects and novel features of the present invention will be more clearly and fully set forth in the following specification and claims.

In the drawings forming a part of the specification:

FIGURE 1 is a perspective view of the tongs in readiness for use.

FIGURE 2 is an elevational view of the tongs showing the manner in which the tong ends fit between a dressed turkey or the like and the walls of a roasting pan.

FIGURE 3 is a side elevational view of one of the tong arms.

FIGURE 4 is a side elevational view of the other of the tong arms.

FIGURE 5 is an elevational view of one of the tong arms, showing the relationship of the three sections of the arms.

The tongs are indicated in general by the letter A, and are particularly designed for use in lifting pieces of meat such as the turkey B from a roasting pan or the like, which is indicated in general by the letter C.

The pair of tongs A includes a tong arm 10, and a second tong arm 11. With one exception, the tong arms 10 and 11 are identical and in profile appear as indicated in FIGURE 5 of the drawings. Accordingly, but one of the arms is illustrated in FIGURE 5.

The tong arms 10 and 11 are formed of elongated substantially rectangular loops of rectangular form, the arm 10 including generally parallel sides 12 which are connected by a right angular lower end forming a gripping end 13 and a right angular upper handle bar or handle end 14. The rectangular loop is made into endless form by welding or otherwise securing the abutting ends 15 of the rod forming the loop together.

The longitudinal sides 12 are bent to form sections on three intersecting planes. The sides 12 are bent as indicated at 16 to form a U-shaped lower section having the cross bar 13, and adjoining parallel loops portions 17. The loop sides 12 are also bent as indicated at 19 to divide the remainder of the sides into an intermediate section between the points of bend 16 and 19 formed by parallel rod portions 20, and a U-shaped upper section including parallel rod portions 21 extending from the points of bend 19 to the handle end 14, and also including the handle end.

The tong arm 11 also includes parallel longitudinal sides 22, a cross bar 23 forming a gripping end, and a cross-member 24 forming a handle member. The loop sides 22 are bent as indicated at 25 to form a U-shaped lower section 26, and are bent at 27 to define intermediate bar portions 29, the remainder of the loop forming the upper section 30 which is an inverted U-shaped form.

As indicated in FIGURE 3 of the drawings, the sides 12 of the tong arm 10 are outwardly offset a distance of about one half the diameter of the rod from which the tong arm 10 is formed. These offset areas 31 are located about one-third of the distance from the handle member 14 to the points of bend 19. Similarly, as shown in FIGURE 4 of the drawings, the upper section 30 has portions of the tong arm sides 22 offset inwardly a distance of substantially one-half the diameter of the rod from which the tong arm 11 is formed. These inwardly offset portions 32 are located about one-third of the distance from the handle member 24 to the points of bend 27.

When assembled, the outwardly offset areas 31 and the inwardly offset areas 32 interengage and form a pivot joint between the tong arms 10 and 11. As indicated in FIGURE 5, the centre of pivot 33 is three and three-eighths inches from the handle end 14 or 24 of the tong arm, and the upper section which extends to the points of bend 19 or 27 is nine inches long. The intermediate section 20 or 29 is four and five-eighths inches long, while the lower section 17, 13 or 26 is two and three-eighths inches long. The plane of the intermediate section 19 or 27 is at an angle of one hundred fifty degrees from the plane of the upper sections 21, 14 or 30 and the plane of the lower sections 17, 13 or 26, as is all shown in FIGURE 3.

When the arms are in pivotal relation, transverse braces 34 and 35 are secured to connect the tong arm sides 12 of the arm 10 and to connect the tong arm sides 22 of the arm 11. These braces are located just below the offset portions 31 and 32. The cross-brace 34 prevents the tong arm sides 12 of the arm 10 from spreading apart, and prevents the tong arm sides 22 of the arm 11 from flexing toward one another, thereby holding the tong arms pivotally connected.

The particular form of the tong arms is of considerable importance when handling a large object like the turkey B. It will be noted that when the tongs are spread apart the maximum distance (or slightly more than is shown in FIGURE 2 of the drawings), the lower sections of the tong arms are almost parallel to the slightly sloping side walls of the roaster C. It will also be noted that when the lower extremities of the tong levers are engaged within the upper edges of the walls of the pan or roaster C, the lower sections of the tongs are even farther spread apart. As a result, the tongs may extend about any object which does not actually completely fill the width of the roaster. At the same time the tongs, when gripped, extend sufficiently below the turkey B to permit it to be easily lifted from the roaster.

In accordance with the patent statutes, I have described the principles of construction and operation of my meat tongs, and while I have endeavored to set forth the best embodiment thereof I desire to have it understood that changes may be made within the scope of the following claims without departing from the spirit of my invention.

I claim:

1. A meat tongs including:
a pair of tong lever arms,
each tong lever arm comprising an elongated generally rectangular frame, the lower end of each frame comprising a gripping member and the upper end of each frame comprising a handle member,
said lever arms each being bent to provide a lower end section, an intermediate section, and an upper end section,
the portions of said frames forming each section being in a common plane, and the plane of the intermediate section forming an obtuse angle of substantially one hundred fifty degrees with the plane of each of the lower and upper sections, the angles of each frame being located on the same side of the plane of the intermediate section,
the intermediate section being longer than the lower section and shorter than the upper section, and
means pivotally connecting the sides of upper end section of said rectangular frames at points nearer the handle end than the intermediate section.

2. The structure of claim 1 and in which the intermediate section is about twice as long as the lower section and half as long as the upper section.

3. The structure of claim 2 and in which the pivotal connection between the tong lever arms is generally one-third the length of the upper section from the handle member.

4. The structure of claim 1 and in which portions of the sides of one frame are offset inwardly to accommodate corresponding outwardly offset portions of the other frame, and including a transverse bar extending across each frame adjacent said offset portions to prevent inward or outward flexing of the frame sides.

References Cited

UNITED STATES PATENTS

| | | | |
|---|---|---|---|
| 1,522,067 | 1/1925 | McBride | 294—28 |
| 2,029,809 | 2/1936 | Connolly | 294—28 |

FOREIGN PATENTS

| | | |
|---|---|---|
| 167,669 | 3/1934 | Switzerland. |

GERALD M. FORLENZA, *Primary Examiner.*

G. F. ABRAHAM, *Assistant Examiner.*